United States Patent Office 3,407,119
Patented Oct. 22, 1968

3,407,119
9β,10α-STEROIDS AND METHODS OF
PRODUCING THE SAME
Jan de Flines and Willem Frederik van der Waard, Delft, Netherlands, assignors to Koninklijke Nederlandsche Gist- en Spiritusfabriek N.V., Delft, Netherlands, a corporation of the Netherlands
No Drawing. Filed July 8, 1965, Ser. No. 470,607
Claims priority, application Great Britain, Sept. 14, 1964, 37,443/64
1 Claim. (Cl. 195—51)

ABSTRACT OF THE DISCLOSURE

A method of introducing a 15α-hydroxyl group in $\Delta^4$-9β,10α-pregnene-3,20-diones by microbiological hydroxylation with enzymes of *Colletotrichum gloeosporioides* with high yields.

The invention relates to new 9β,10α-steroids of the general formula

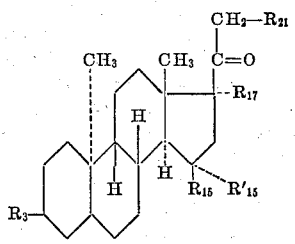

in which formula $R_3$ represents 3-keto-4-dehydro, 3-keto-4,6-bisdehydro, 3-keto-1,4,6-trisdehydro or 3-keto-1,4-bisdehydro,
$R_{15}$ represents a hydroxy group, an acyloxy group or an alkoxy group, when $R'_{15}$ represents a hydrogen atom,
$R'_{15}$ represents a hydroxy group, an acyloxy group or an alkoxy group, when $R_{15}$ represents a hydrogen atom or
$R_{15}$ and $R'_{15}$ together represent a keto oxygen atom,
$R_{17}$ represents a hydrogen atom or a hydroxy group or an alkoxy group or an acyloxy group and
$R_{21}$ represents a hydrogen atom, a hydroxy group, an alkoxy group or an acyloxy group.

The compounds according to the invention have in general no glucocorticoidal activity but show anti-inflammatory activity. Further these compounds show a marked tendency to absence of uterotrophic, progestational, androgenic and/or anabolic activity.

Thus 15α-hydroxy-9β,10α-pregn-4-ene-3,20-dione, the 15-acetate thereof and 15α,17α,21 - trihydroxy - 9β,10α-pregn-4-ene-3,20-dione show under normal conditions of tests on animals anti-inflammatory activity but show no glucocorticoidal, no uterotrophic, no progestational, no androgenic and no anabolic activity.

The hydrogen atoms or methyl groups at the carbon atoms 8, 9, 10, 13 and 14 of the compounds according to the invention have the same stereochemical configuration as the corresponding hydrogen atoms and methyl groups in dihydroisolumisterone. Castells et al. Proc. of the Chemical Society, 1958, p. 7, has shown that dihydroisolumisterone has the configuration 8β,9β,10α - methyl, 13β-methyl,14α.

The novel steroids of the invention are indicated as 9β,10α-steroids to indicate at which carbon atoms (9 and 10) the stereo-configuration deviates from the one of the normal steroids and in which sense (9β,10α in contradistinction to the 9α,10β-configuration of the normal steroids).

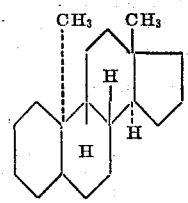

In the above given structural formula the β-position at the carbon atoms 8, 9 and 13 is indicated by a solid line, whereas the α-position at the carbon atoms 10 and 14 is indicated by a broken line. It should be observed that the configuration of the hydrogen atoms or substituents at the other carbon atoms may be either α, β or planar. Whether a hydrogen atom or a substituent at these other carbon atoms is in one of these positions is indicated by the chemical name only and not by the chemical formulae unless explicitly so expressed as in the case of a dotted line which always indicates the α-position.

When $R_{15}$, $R'_{15}$, $R_{17}$ or $R_{21}$ represent an alkoxy group then the alkyl part thereof is preferable an aliphatic or mixed aliphatic-aromatic or mixed aliphatic-alicyclic group containing from 1–11 carbon atoms. As examples of such groups may be mentioned methoxy-, ethoxy-, propoxy-, tert.butoxy-, cyclopentyloxy-, cyclohexyloxy and benzyloxy. When these groups represent an acyloxy group then $R_{15}$, $R'_{15}$, $R_{17}$ and $R_{21}$ are preferable the acyloxy group of an aliphatic mono-, di- or tricarboxylic acid containing from 1–20 carbon atoms or the acyloxy group of a mixed aliphatic-aromatic carboxylic acid. Examples of these groups $R_{15}$, $R'_{15}$, $R_{17}$ and $R_{21}$ are formoxy-, acetoxy-, propionoxy-, butyroxy-, the acyloxy groups of oleic acid, palmitic acid, stearic acid, enanthoic acid, undecyloic acid, caproic acid, pivelic acid, succinic acid, malonic acid, citric acid, benzoic aid and p-hexyloxyphenylpropionic acid, sulphuric acid or phosphoric acid.

The compounds according to the invention may be prepared from 9β,10α-steroids by methods known per se.

In particular the methods of producing the new 9β,10α-steroids are characterized in that (a) a compound of the formula

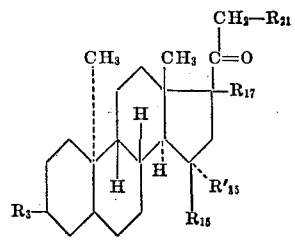

in which formula $R_3$, $R_{15}$, $R'_{15}$, $R_{17}$ and $R_{21}$ have the meaning as given in the definition of the invention, provided that at least one of the groups $R_{15}$, $R'_{15}$, $R_{17}$ and $R_{21}$ represent a hydroxy group, is subjected to an acylation reaction to convert at least one of the free hydroxy groups present in the starting material to an esterified hydroxy group, or (b) a compound of the formula

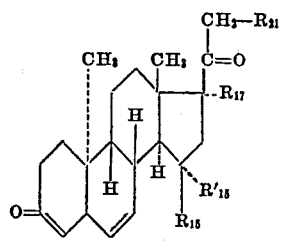

in which formula a double bond may be present between carbon atoms 6 and 7 and wherein further $R_{15}$, $R'_{15}$, $R_{17}$ and $R_{21}$ have the meaning as given in the definition of the invention, is subjected to introduction of a double bond between the carbon atoms 1 and 2, or (c) a compound of the formula

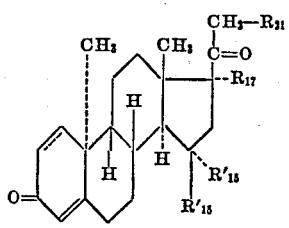

in which formula a double bond may be present between the carbon atoms 1 and 2 and wherein further $R_{15}$, $R'_{15}$, $R_{17}$ and $R_{21}$ have the meaning as given in the definition of the invention, is subjected to introduction of a double bond between the carbon atoms 6 and 7, or (d) a compound of the formula

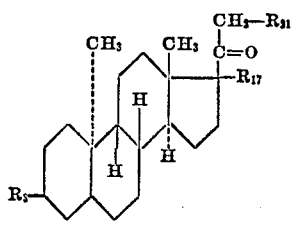

in which formula $R_3$, $R_{21}$ and $R_{17}$ have the meaning as given in the definition of the invention, is subjected to microbiological hydroxylation at position 15, or (e) a compound of the formula

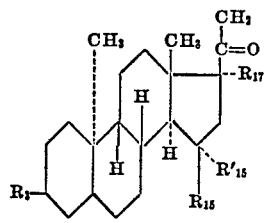

in which formula $R_3$, $R_{15}$ and $R'_{15}$ and $R_{17}$ have the meaning as given in the definition of the invention is subjected to hydroxylation at position 21, or (f) a compound of the formula

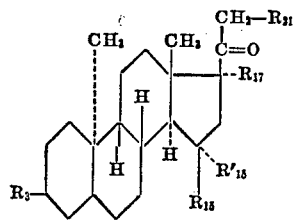

in which formula $R_3$, $R_{17}$ and $R_{21}$ have the meaning as given in the definition of the invention and $R_{15}$ is a hydroxy group when $R'_{15}$ is a hydrogen atom and $R'_{15}$ is a hydroxy group when $R_{15}$ is a hydrogen atom, is subjected to oxidising agents capable of converting the 15-hydroxy group into a 15-keto group.

These processes may be elucidated as follows.

(Formula a.)—Acylation may be carried out by a classic esterifying reaction, for example by reaction of the compound to be esterified with an acylanhydride or an acylchloride, in the presence of pyridine and an indifferent solvent, such as benzene or petroleum ether. The reaction temperature should be between 10° and 100° C., preferably between 15° and 35° C. Normally the reaction duration amounts from 2 hours to 30 minutes when the reaction temperature is between 70° and 100° C. In this manner 15α-hydroxy-9β,10α-pregn-4-ene-3,20-dione can be converted into 15α-hydroxy-9β,10α-pregn-4-ene-3,20-dione 15-acetate by means of acetic anhydride and pyridine.

(Formula b.)—Introduction of a double bond between the carbon atoms 1 and 2 may be carried out by direct or by indirect 1-dehydrogenation.

The following known methods can be used for direct 1,2-dehydrogenation:

(1) With iodine pentoxide or periodic acid, Dutch Patent Application 215.154 and 211.626.

(2) With selenium dioxide, J. H. Fried et al., J. Am. Chem. Soc. 81, 1235 (1959), A. Bowers et al., J. Am. Chem. Soc. 81, 5991, (1959).

(3) With chloranil e.g. for the conversion of 3-keto-$\Delta^4$ into 3-keto-$\Delta^{1,4,6}$-steroids, E. J. Agnello and G. D. Laubach, J. Am. Chem. Soc. 82, 4293 (1960).

(4) With 2,3-dichloro-5,6-dicyanobenzoquinone, D. Burn et al., Proc. Chem. Soc. 1960, 14.

(5) By dehydrogenation of 3-keto-steroids with lead tetra acetate, R. L. Clarke, J. Am. Chem. Soc. 77, 661 (1955), R. Joly, Bull. Soc. 366 (1958).

The following method can be used for indirect 1,2-dehydrohalogenation, by selective 1,2-dehydrohalogenation of 2-halo-3-keto-steroids e.g. with an organic base such as collidine or with lithiumbromide and lithium carbonate in dimethylformamide.

(Formula c.)—Introduction of a 6,7 double bond may be carried out by one of the following methods: by direct 6-dehydrogenation of 3-keto-$\Delta^4$-retro-steroids.

(1) With substituted benzoquinones, such as chloranil, 2,3-dichloro-5,6-dicyanobenzoquinone.

(2) With manganese dioxide.

(Formula d.)—Hydroxylation at position 15 may be carried out by microbiological processes. Very suitable microorganisms in this respect are microorganisms of the class of *Colletotrichum gloesosporioides*. Also *Aspergillus ochraceus* may be used but with this microorganism lower yields are obtained.

These micro-organisms are cultivated under aerobic conditions under otherwise known microbiological techniques. To this end, for example, first a culture of the fungus is developed under aerobic conditions in a nutrient solution, after which a fermentation medium containing the steroid to be oxygenated, which may be present in solution or suspension, is subjected to the oxybiontic dissimilation activity of the mycelium formed. The nutrient solution contains essentially a carbon source and a nitrogen source, for example a carbohydrate, for example, glucose, maltose or starch, and an organic nitrogen source, for example, corn steep liquor, yeast extract, protein hydrolysates or amino acids, or an inorganic nitrogen source such as ammonium salts or alkali metal nitrates. To the medium containing the steroid to be oxygenated and one or more of the aforesaid nutrient sources, an anti-foam agent, for example glyceryl monostearate, may, if desired, be added.

The most suitable fermentation temperature usually lies between 20° C. and 28° C., although higher or lower temperatures between 15° C. and 35° C. are, in general, also suitable.

The pH value of the medium can be adjusted in a conventional manner and is preferably brought to a value between 6 and 7.

The time required for the oxidation of the steroid may vary between wide limits, but usually the oxygenation period is at an optimum between 10 and 48 hours for full conversion.

The 15α-hydroxy-steroid compounds obtained after the termination of the oxygenation process may be separated out of the medium and/or the mycelium in any of the known manners, preferably by extraction with organic solvents not miscible with water, for example diethyl ether, ethyl acetate, amyl acetate, methyl isobutyl ketone or other suitable esters and ketones. Particularly methyl isobutyl ketone is a suitable extraction agent.

The oxygenated steroid may also be isolated and purified by chromatographic methods, in conjunction with extraction from the fermentation medium or otherwise.

According to a feature of the invention, the 15-hydroxy-steroids may also be formed by reacting spores of the said micro-organisms with solutions or dispersions of the starting steroids mentioned above.

By way of illustration, some preferred methods embodying the invention will now be described more fully with reference to the following specific examples.

So far this micro-organism has not been used in the normal steroid series and thus the results achieved herewith were completely unpredictable. It should be observed that microbiological 15-hydroxylation of normal steroids has been known since some time. As such may be mentioned that fungi of the classes genus or species Sclerotinia,

*Helminthosporium sativum,*
*Gibberella saubinetti,*
*Chrysosporium panorum,*
*Colletotrichum antirrhini,*
*Bacillus megatherium,*
Penicillium sp., ATCC 12,556,
Penicillium sp., ATCC 11,598,
*Streptomyces aureus* WC 3569,
Streptomyces sp. WC 3676,
*Spicaria simplicissima* (ATCC No. 13,595),
*Hormiodendrum olivaceum* (ATCC 13,596),
*Poria cocos,*

*Coriolus versicolor,* have been reported as capable 15-hydroxylators in the pregnane series.

Hydroxylation at 15-position may also be carried out by chemical methods.

According to one method the 3,20-diethylene ketal of a 3,20-diketo-17α-hydroxy-9β,10α-4 - dehydro - pregnane is treated with SOCl₂ in the presence of pyridine at a temperature of —5° for several hours (about 10–20 hours), which reaction results in the formation of the corresponding 16-dehydro compound. Subsequently this compound is brominated in allylic position with respect to the 16-dehydro bond, preferably with N-bromosuccinimid, the thus produced 15α or —β bromo compound is treated with sodium iodide to produce the 3,20-diketal of 15-iodo-9β,10α-pregna-5,16-diene-3,20-dione, which compound on acetolysis with potassium acetate produces 15 (α or β)-hydroxy-9β,10α-pregna-5,16-diene-3,20-dione 15 - acetate. On hydrogenation in the presence of a catalyst the 16-dehydro bond can be hydrogenated. Further on hydrolysis in acidic medium the ketal functions may be split off to restore the 3,20-diketo-4-dehydro grouping. Finally on saponification the 15-acetoxy group may be converted into a 15-hydroxy group.

(Formula e.)—Introduction of a 21-hydroxy group or of a 21-acyloxy group may be achieved in several ways. One suitable method is direct introduction of an acetoxy group by oxidation with leadtetraacetate.

According to another method the starting material is condensated with oxalic acid dialkylester, followed by halogenation by treatment with molecular halogen, converting the thus obtained product into the 21-halogeno compound, for example by treatment with alkali alkoxide and introducing an acyloxy group into the latter product, for example by treatment with an alkaline or earthalkaline salt of an organic acid.

According to still another method the starting material is subjected to direct reaction with iodine or bromine in a suitable solvent, followed by introduction of an acyloxy group as mentioned in the last part of the foregoing paragraph.

According to still another method the starting material is subjected to microbiological hydroxylation for example with *Ophiobolus herpotrichus.*

(Formula f.)—The oxidation of the 15-hydroxy compound to produce a 15-keto compound can easily be carried out by chromic acid oxidation in glacial acetic acid and other mild oxidation agents, such as chromium trioxide, potassium-, sodium- or ammonium bichromate, furthermore potassium permanganate, all in acidic medium.

The compounds according to the invention may be worked up in the usual manner to pharmaceutical preparations e.g. tablets, injection liquids, suppositoria and the like.

Examples

In the following examples 20–20 and 5–5 media have been used.

The 20–20 medium was prepared as follows. A medium consisting of tap water in which has been dissolved per 1000 ml. 20 g. of corn steep liquor (dry substance content) and 20 g. of glucose and so much of sodium hydroxide to adjust the pH value of the medium to 6.5. The 20–20 medium has been sterilised at 120° for 20 minutes. The 5–5 medium was prepared in the same manner as the 20–20 medium but it contained 5 g. of corn steep liquor and 5 g. of glucose instead of 20 g. each of these substances.

Example I.—Conversion of 9β,10α-pregn-4-ene-3,20-dione by means of *Aspergillus ochraceus* NRRL 405

The strain was obtained from the Northern Regional Research Laboratory (Peoria, Ill.) and preserved on oats glucose agar, where it formed rich spores within a few days. Inoculation flasks containing 500 mls. of sterile 20–20 medium can be directly inoculated from the strain and are suitable for re-inoculation after shaking for 48 hours. The contents of three flasks was used to inoculate a seed tank. The latter contained 70 litres of 20–20 medium, stirring was performed at a rate of 400 rev./min. The gross volume of the fermenter was 100 litres and air was passed through at a rate of 95 litres per minute; after 24 hours the inoculation material was ready and 30 litres thereof were employed for inoculating 2200 litres of sterile 5–5 medium contained in a 4000 litres tank. This culture was stirred at a rate of 140 rev./min. and 1500 litres of air per minute was passed through. The temperature was 30° C. 24 hours after the inoculation a sufficient quantity of mycelium had been formed in the culture and the steroid to be converted could be added, i.e., 333.3 gms. of 9β,10α-pregn-4-ene-3,20-dione, dissolved in 25 litres of 96% ethanol, after which the fermentation was continued under the aforesaid conditions. After 42 hours the substrate had been completely converted into 11α-hydroxy - 9β,10α - pregn-4-ene-3,20-dione with a few by-products. After the removal of the mycelium by filtering, the culture filtrate was extracted three times with ⅓ volume of methylisobutylketone. The extracts were concentrated in vacuo to 20 litres and treated with 100 gms. of activated carbon. By evaporation of the solution in vacuo to about 1 litre, 210 gms. of crude crystals were isolated. The mother liquor was washed with sodium hydroxide in water and evaporated in vacuo to a dry residue, which yielded by various crystallisations a further 35 gms. of crude crystals.

In total 245 gms. of crude product was obtained, which appeared to consist of 11α-hydroxy-9β,10α-pregn-4-ene-3,20-dione with a few by-products.

Part thereof, i.e., 223 gms. was separated by a series of crystallisations into:

(a) 200 gms. of 11α-hydroxy-9β,10α-pregn-4-ene-3,20-dione, melting point 224.5–227.5° C.

$[α]_D$ —36° (c.=1, chloroform). IR spectrum: 3615, 1700, 1662, 1612 cm.$^{-1}$ (chloroform).

(b) 0.43 gm. of 15α-hydroxy-9β,10α-pregn-4-ene-3,20-dione, melting point 202–206° C.

$[α]_D$ —23.2° (c.=1, chloroform).
UV max. 242 mμ (ε=16,200, methanol).
IR spectrum (chloroform): 3620, 1705, 1665, 1614.

Example II.—Conversion of 9β,10α-pregn-4-ene-3,20-dione by means of *Colletotrichum gloeosporioides*

The conversion of 9β,10α-pregn-4-ene-3,20-dione into 15α-hydroxy - 9β,10α - pregn - 4 - ene-3,20-dione was performed with the aid of *Colletotrichum gloeosporioides* Penz. St. Nolla. This strain was received from the "Centraal Bureau voor Schimmelcultures" (Baarn, Holland) and preserved on oatmeal agar. Parts of a well-grown culture on said agar were transferred to eight inoculation flasks of 2 litres, each containing 500 mls. of 20–20 medium. After three days of shaking at 26° C. a sufficient quantity of mycelium had been formed and a transfer to the main fermentation could be made. This was carried out in a fermenter of 100 litres containing 60 litres of 5–5 medium. During the fermentation stirring was continued at a rate of 140 rev./min., whilst 3500 litres of sterile air was passed through each hour. The steroid—8 gms. of 9β,10α - pregn - 4 - ene-3,20-dione—was added 24 hours after the inoculation. It was dissolved in 500 mls. of acetone. The fermentation was continued under the aforesaid conditions at 26° C. After 50 hours the substrate had been converted into 15α-hydroxy-9β,10α-pregn-4-ene-3,20-dione.

After the removal of the mycelium by filtering, the culture filtrate was three times extracted with ⅕ volume of methylisobutylketone. The extract was concentrated in vacuo to 2 litres, washed with sodium hydroxide in water and concentrated in vacuo to 25 mls., from which 3.26 gms. of crystalline product was obtained.

From the mother liquor evaporation to dryness and crystallisation from acetone-heptane yielded a further 0.3 gm. of crystalline product. The total product was recrystallised from acetone-heptane, then twice from methanol-water and finally from benzene. Yield: 2.42 gms. of 15α-hydroxy-9β,10α-pregn-4-ene-3,20-dione, melting point 203–205° C.

$[α]_D$=—23.2° (c.=1, chloroform). Ultraviolet max. 242 mμ.
ε=16,200 (methanol).
Infrared spectrum (chloroform): 3620, 1705, 1665, 1615.
Elementary analysis: C, 76.36%; H, 9.12% (theor. $C_{21}H_{30}O_3$: C, 76.32%; H, 9.15%).

Part of the product was converted by means of acetic acid anhydride/pyridine into 15α-acetoxy-9β,10α-pregn-4-ene-3,20-dione, melting point 122–124° C.

$[α]_D$ —21.3° (chloroform).
UV max. 241 mμ. ε=16,700 (methanol).
IR spectrum (KBr): 1730, 1705, 1670, 1615, 1250, 1238, 1040.
Elementary analysis: C, 73.71%; H, 8.61% (theor. for $C_{23}H_{32}O_4$: C, 74.16%; H, 8.66%).

A further part was oxidized with chromium trioxide in acetic acid to 15-keto-9β,10α-pregn-4-ene-3,20-dione, melting point 175–178° C.

$[α]_D$=+1.75° (c.=1, chloroform).
UV max. 242 mμ. ε=20,700 (methanol).
IR spectrum (carbontetrachloride) 1740, 1710, 1668, 1618.
Elementary analysis: C, 76.92%; H, 8.59% (theor. for $C_{21}H_{28}O_3$: C, 76.79%; H, 8.59%).

Example III

Starting material: 17α - hydroxy - 9β,10α - pregn-4-ene-3,20-dione. This compound was converted by microbiological hydroxylation with *Colletotrichum gloeosporioides* into 15α,17α - dihydroxy - 9β,10α - pregn-4-ene-3,20-dione in the same manner as described in Example II. IR spectrum (in KBr): 1695, 1650, 1615, 1240, 1215, 1090, 1068 and 1040.

Example IV

15α-hydroxy-9β,10α-pregn-4-ene-3,20-dione was reacted with equimolar amounts of acetylchloride and pyridine to produce 15α-hydroxy-9β,10α-pregn-4-ene-3,20-dione 15α-acetate.

Example V

15α,17α - dihydroxy-9β,10α-pregn-4-ene-3,20-dione was esterified with excess of acetic anhydride and p-toluene sulphonic acid to produce corresponding 15α,17α-diacetate.

Example VI

Iodine (60 g.) was added to a stirred mixture of 17α-hydroxy - 9β,10α - pregn-4-ene-3,20-dione (40 g.), finely powdered dry calcium oxide (30 g.) and methanol (1200 ml). After ¼–1 hour at ca. 30° the colour of iodine had disappeared. The yellow suspension was filtered and the solids were washed with chloroform. The filtrate and the washings were poured out into a saturated sodium chloride solution. The product was extracted with methylene chloride, washed with sodium chloride solution and dried. A solution of acetic acid (210 ml.), triethyl amine (320 ml.) and acetone (800 ml.) was added. Methylene chloride and chloroform were distilled off and another solution of triethyl ammonium acetate in acetone was added. (Acetic acid (52 ml.), triethyl amine (78 ml.) and acetone (200 ml.).) After refluxing this solution for two hours part of the solvents was distilled off in vacuo to an end-volume of 600 ml. Saturated sodium chloride solution (500 ml.) was added and the product was extracted with methylene chloride. After washing and drying the solvent was distilled off.

In order to separate the thus obtained 21-acetate from unreacted starting material it proved advantageous to saponify the crude product: After dissolving this material in methanol (700 ml.), potassium carbonate (8.3 g.) dissolved in water (135 ml.) was added. This reaction mixture was stirred at room temperature in a nitrogen atmosphere for 1½ hours. Then acetic acid (15 ml.) in water (45 ml.) was added. The mixture was poured into a sodium chloride solution (500 ml.) and extracted with methylene chloride. The combined extracts were washed, dried and evaporated in vacuo.

The crude product (ca. 42 g.) was chromatographed on silicagel. The fractions were combined on account of thin-layer chromatograms. After evaporation of the solvents about 24 g. of 17α,21-dihydroxy-9β,10α-pregn-4-ene-3,20-dione were obtained. From the fore-runnings of the chromatogram ca. 5 g. of starting material were recovered.

Final purification of the said 17α,21-dihydroxy compound was achieved by crystallisation from acetic acid. The yield was 22.9 g.; M.P.~225° (dec.

ε(242 nm.)=16, 300);
$[α]_D^{25}$=—108°.
Found: C, 72.8; H, 8.4; O, 18.9. Calculated for $C_{21}H_{30}O_4$ (346.47): C, 72.80; H, 8.73; O, 18.47. I.R. spectrum bands at: 3370, 1704, 1649, 1611, 1088 and 1941 cm$^{-1}$. Thus produced 17α,21-dihydroxy-9β,10α-pregn-4-ene-3,20-dione was subjected to microbiological 11-hydroxylation with *Aspergillus ochraceus* in the manner as shown in Belgian patent specification 633.385 to produce 11α,17α,21-trihydroxy-9β,10α-pregn-4-ene-3,20-dione and in addition to the latter compound 15α,17a,21-trihydroxy-9β,10α-pregn-4-ene-3,20-dione. The latter compound was separated from the mother liquors of the former one by means of counter current distribution followed by chromatography and crystallisation from suitable solvents such as acetone or ethanol.

Melting point (of 15α,17α,21-trihydroxy-9β,10α-pregn-4-ene-3,20-dione)=249–251° C. U.V. ε=16.400 at $$\lambda = 242 \text{ nm.}$$

Infrared absorption bands (in KBr) 3310, 1693, 1642, 1611, 1275, 1238, 1213, 1117, 1105, 1086, 1077 and 1037 cm$^{-1}$.

What is claimed is:
1. A method of producing 9β,10α-steroids of the formula

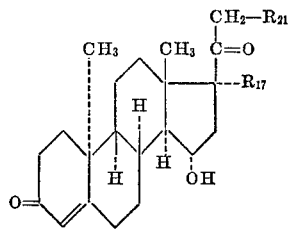

wherein $R_{17}$ and $R_{21}$ are selected from the group consisting of hydrogen, hydroxy and acyloxy which comprises subjecting a compound of the formula

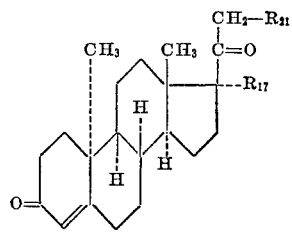

wherein $R_{17}$ and $R_{21}$ have the above definition to microbiological hydroxylation with enzymes of *Colletotrichum gloeosporioides* and recovering the corresponding 15α-hydroxyl compound.

References Cited
UNITED STATES PATENTS

| | | | |
|---|---|---|---|
| 2,879,280 | 3/1959 | Fried et al. | 195—51 |
| 2,960,435 | 11/1960 | Donin et al. | 195—51 |
| 3,010,877 | 11/1961 | Allen et al. | 195—51 |
| 3,198,792 | 8/1965 | Reerink et al. | 195—51 |

ALVIN E. TANENHOLTZ, *Primary Examiner.*